(12) United States Patent
Gates et al.

(10) Patent No.: US 6,878,780 B2
(45) Date of Patent: Apr. 12, 2005

(54) ACRYLIC POWDER COATING RESIN HAVING LOW VOLATILITY

(75) Inventors: Jeffrey A. Gates, West Chester, OH (US); Michael S. Sharp, Brookville, IN (US)

(73) Assignee: Cognis Corporation, Ambler, PA (US)

( * ) Notice: Subject to any disclaimer, the term of this patent is extended or adjusted under 35 U.S.C. 154(b) by 107 days.

(21) Appl. No.: 10/462,263

(22) Filed: Jun. 16, 2003

(65) Prior Publication Data

US 2003/0216523 A1 Nov. 20, 2003

Related U.S. Application Data

(63) Continuation of application No. 10/078,119, filed on Feb. 15, 2002, now abandoned.
(60) Provisional application No. 60/274,966, filed on Mar. 12, 2001.

(51) Int. Cl.$^7$ .................................................. C08F 8/14
(52) U.S. Cl. ..................................... 525/386; 525/327.3
(58) Field of Search .............................. 525/386, 327.3

(56) References Cited

U.S. PATENT DOCUMENTS

| | | | | |
|---|---|---|---|---|
| 3,752,870 A | * | 8/1973 | Labana | ....................... 523/437 |
| 4,142,018 A | * | 2/1979 | Ozawa et al. | ................ 428/323 |
| 5,254,466 A | * | 10/1993 | Picataggio et al. | .......... 435/142 |
| 5,292,825 A | * | 3/1994 | Yamamoto et al. | .......... 525/340 |

* cited by examiner

*Primary Examiner*—Bernard Lipman
(74) *Attorney, Agent, or Firm*—Aaron R. Ettelman

(57) ABSTRACT

Powder coating compositions having reduced volatility and improved processibility compared to conventional powder coatings consist essentially of a copolymer having pendant functionalities or pendant groups capable of reacting with a dicarboxylic acid such as the glycidyl groups of glycidyl acrylate or methacrylate copolymer and a cross-linking effective amount of a dicarboxylic acid. The reaction of the above pendant groups and the dicarboxylic acid cross-links or cures the powder coating after application to a substrate. The dicarboxylic acids according to the invention eliminate the need for a third component which is a flow control agent which improves the processibility of a two-component powder coating. The dicarboxylic acids according to the invention have a sublimation temperature great enough to decrease or prevent their vaporization during the curing of the powder coating and have a melting point low enough to impart improved flow properties to the powder coatings.

7 Claims, No Drawings

ACRYLIC POWDER COATING RESIN HAVING LOW VOLATILITY

CROSS-REFERENCE TO RELATED APPLICATIONS

This application is a continuation of application Ser. No. 10/078,119, filed on Feb. 15, 2002 now abandoned, which also claims the benefit of provisional application Ser. No. 60/274,966, filed on Mar. 12, 2001, the entire contents of both of which are incorporated herein by reference.

STATEMENT REGARDING FEDERALLY SPONSORED RESEARCH OR DEVELOPMENT

This invention was funded, at least in part, under a grant from the Department of Commerce, NIST-ATP Cooperative Agreement Number 70NANB8H4033. The Government may therefore have certain rights in the invention.

BACKGROUND OF THE INVENTION

Thermosetting powder coatings have gained considerable popularity in recent years over liquid coatings for a number of reasons. Powder coatings are virtually free of harmful volatile organic compounds (VOC) normally present in liquid coatings, and, as a result, give off little, if any, volatiles to the environment when cured. This eliminates solvent emission problems and dangers to the health of workers employed in the coating operations. Powder coatings also improve working hygiene, since they are in dry solid form with no messy liquids associated with them to adhere to workers' clothes and coating equipment. Furthermore, they are easily swept up in the event of a spill without requiring special cleaning and spill containment supplies. Another advantage is that they are 100% recyclable. Over-sprayed powders are normally recycled during the coating operation and recombined with the original powder feed. This leads to very high coating efficiencies and minimal waste generation.

SUMMARY OF THE INVENTION

The present invention relates to a powder coating composition having reduced volatility and improved processibility compared to conventional powder coatings. The powder coating composition according to the invention consist essentially of a copolymer having pendant functionalities or pendant groups capable of reacting with a dicarboxylic acid such as the glycidyl groups of glycidyl acrylate or methacrylate copolymer and a cross-linking effective amount of a dicarboxylic acid. The reaction of the above pendant groups and the dicarboxylic acid cross-links or cures the powder coating after application to a substrate. The dicarboxylic acids according to the invention eliminate the need for a third component which is a flow control agent which improves the processibility of a two-component powder coating. The dicarboxylic acids according to the invention have a sublimation temperature great enough to decrease or prevent their vaporization during the curing of the powder coating and have a melting point low enough to impart improved flow properties to the powder coatings.

DETAILED DESCRIPTION OF THE INVENTION

The copolymer having pendant functionalities capable of reacting with a dicarboxylic acid according to the invention can be any copolymer that is suitable for use in powder coating compositions and also contains pendant functionalities capable of reacting with the carboxyl group of a carboxylic acid. Functionalities capable of reacting with the carboxyl group of a carboxylic add include, but are not limited to, epoxides, alcohols, amines, thiols, and carboxylic acids.

The copolymers according to the invention include, but are not limited to, acrylate and methacrylate copolymers of glycidyl acrylate and methacrylate as described in U.S. Pat. No. 3,752,870, the entire contents of which are incorporated herein by reference. Other examples of copolymers include those containing hydroxyethyl and hydroxypropyl pendant functionalities such as copolymers of acrylic and methacrylic esters and 2-hydroxyethyl acrylate and/or methacrylate and acrylic and methacrylic esters and 2-hydroxypropyl acrylate and/or methacrylate. The preferred copolymer is one that contains glycidyl acrylate and/or glycidyl methacrylate.

The dicarboxylic acids useful in the compositions according to the invention are dicarboxylic acids having at least 14 carbon atoms, preferably saturated dicarboxylic acids having from about 14 to about 20 carbon atoms. Such dicarboxylic acids can be prepared by standard chemical methods known to those of ordinary skill in the art and by biooxidation of the corresponding alkane or mono carboxylic acid such as is described in U.S. Pat. No. 5,254,466, the entire contents of which are incorporated herein by reference. The amount of dicarboxylic acid that can be used in the compositions according to the invention is a cross-linking effective amount which is defined as any amount necessary to cure the powder coating to a desired level. The effective amount will vary and will be readily determinable by one of ordinary skill in the art. Typically, the effective amount will range from about 2% by weight to about 50% by weight of copolymer. The preferred dicarboxylic acid is octadecanedioc acid.

The powder coating compositions according to the invention exhibit reduced volatility and improved processibility compared to conventional powder coatings and do not require the incorporation of a flow control agent to reduce or eliminate the rough flow out of the molten powder coating film that results after the powder coating is applied and heated.

The following examples are meant to illustrate but not to limit the invention.

EXAMPLE 1

Powder Coatings Compounding Method

A series of powder coatings were compounded to evaluate C9, C10, C12, C13, C15, and C18 dibasic acids as curing agents in GMA acrylic resin. The powder coatings were prepared using equal weight percent and approximate molar amounts of dibasic acids compounded with Fine Clad® A207-SA GMA acrylic resin. All powder coatings were compounded using a Brabender No. 6 roller head operating at 50 rpm with a starting temperature of 80° C. and not exceeding 93° C. for approximately 15 minutes to achieve intimate mixing. All powder coating compounds were ground to a fine powder and are identified in Table 1.

TABLE 1

| Sample No. | Dibasic Acid | GMA Acrylic Resin Grams | Dibasic Acid Grams |
|---|---|---|---|
| 00078-173 | C9 | 34.71 | 5.29 |
| 00078-174 | C10 | 34.38 | 5.62 |
| 00078-175 | C12 | 33.6 | 6.4 |
| 00078-176 | C13 | 33.21 | 6.79 |
| 00078-177 | C15 | 32.43 | 7.57 |
| 00078-178 | C18 | 31.32 | 8.68 |
| 00078-190 | C18 | 33.6 | 6.4 |
| 00078-191 | C15 | 33.6 | 6.4 |
| 00078-192 | C13 | 33.6 | 6.4 |
| 00078-193 | C12 | 33.6 | 6.4 |
| 00078-194 | C10 | 33.6 | 6.4 |
| 00078-195 | C9 | 33.6 | 6.4 |

EXAMPLE 2

Inclined Flow and Stability

Inclined flows were performed on the powder coatings after compounding and grinding to a fine powder to determine initial inclined flow characteristics. Subsequent inclined flows were performed over the indicated periods of time to determine the stability of each powder coating. The inclined flow data is listed in the following tables. The powder coatings were evaluated for inclined flow performance at 120° C. and 150° C. using the following method. About 80 milligrams of each powder coating was placed "side by side" onto a 3-inch by 5-inch metal sheet. The sheet was placed into a (120° C. or 150° C.) preheated convection oven for approximately 2 minutes laying flat. After two minutes, the plate was placed on a 55–60 degree incline for 20 minutes (at 120° C. or 150° C.) for inclined flow and curing. After the 20-minute flow and cure period, each cured powder coating flow was evaluated for flow length. Each flow length was determined by measuring from a reference line drawn parallel to the powder coatings on each metal plate.

Initial inclined flow evaluations were performed on laboratory prepared powder coatings at 120° C. and 150° C. shortly after compounding. Additional inclined flows were performed approximately 150 days after the initial inclined flows to determine room temperature stability.

The inclined flows indicate that Sample 00078-178 (contains C18 diacid) has greater flow at 150° C. and superior stability characteristics at 120° C. and 150° C. Sample 00078-177 (contains C15 diacid) appears to have better initial flow characteristics at 120° C. as shown in Table 2.

EXAMPLE 3

Inclined Flows of GMA Acrylic Resin Compounded with Equal Weight Percent Amounts of Dibasic Acid Stored at Room Temperature Initial inclined flow evaluations were performed on laboratory prepared powder coatings at 120° C. and 150° C. shortly after compounding. Additional inclined flows were performed 71 days after the initial inclined flows to determine room temperature stability. The results are shown in Table 3. The samples are identified by the dicarboxylic acid contained therein. For example, sample 00078-195 (C9) is a GMA Acrylic Resin Compounded with azelaic acid.

TABLE 3

| Sample No. | 120° C. Flow Initial Inches | 120° C. Flow After 71 days Inches | % Decrease In Flow | 150° C. Flow Initial Inches | 150° C. Flow After 71 days Inches | % Decrease In Flow |
|---|---|---|---|---|---|---|
| 00078-195 (C9) | 0.6 | 0.1 | 83 | 0.6 | 0.1 | 83 |
| 00078-194 (C10) | 0.65 | 0.55 | 15 | 0.85 | 0.65 | 23 |
| 00078-193 (C12) | 0.75 | 0.7 | 6 | 1.0 | 0.8 | 20 |
| 00078-192 (C13) | 0.8 | 0.7 | 12 | 0.95 | 0.75 | 21 |
| 00078-191 (C15) | 1.0 | 0.95 | 5 | 1.15 | 0.9 | 21 |
| 00078-190 (C18) | 0.9 | 0.9 | 0 | 1.2 | 1.05 | 12 |

EXAMPLE 4

Inclined Flows of GMA Acrylic Resins Compounded with Approximate Molar Amounts of Dibasic Acid Stored at 35° C.

Approximately 10 grams of Sample 00078-175 and 00078-178 were placed in a 35° C. oven 89 days after initial inclined flow evaluation shown in Table 2. Each sample was evaluated for inclined flow after the indicated period of time identified in Table 4.

TABLE 4

| Sample No. | 150° C. Flow Stored 6 Days at 35° C. Inches | 150° C. Flow Stored 36 Days at 35° C. Inches | % Decrease in Flow From Day 6 to Day 36 |
|---|---|---|---|
| 00078-175 (C12) | 0.75 | 0.2 | 73 |
| 00078-178 (C18) | 1.5 | 1.35 | 10 |

TABLE 2

| Sample No. | 120° C. Flow Initial Inches | 120° C. Flow After 151 days Inches | % Decrease In Flow | 150° C. Flow Initial Inches | 150° C. Flow After 152 days Inches | % Decrease In Flow |
|---|---|---|---|---|---|---|
| 00078-173 (C9) | 0.5 | No flow | 100 | 0.75 | No flow | 100 |
| 00078-174 (C10) | 0.5 | 0.35 | 30 | 0.875 | 0.5 | 42 |
| 00078-175 (C12) | 0.75 | 0.65 | 13 | 1.06 | 0.75 | 29 |
| 00078-176 (C13) | 0.875 | 0.8 | 9 | 1.25 | 0.8 | 36 |
| 00078-177 (C15) | 1.25 | 1.1 | 12 | 1.4 | 1.1 | 21 |
| 00078-178 (C18) | 1.1 | 1.1 | 0 | 1.5 | 1.45 | 3 |

EXAMPLE 5

Inclined Flows of GMA Acrylic Resin Compounded with Equal Weight Percent Amounts of Dibasic Acid Stored at 35° C.

Approximately 10 grams of Sample 00078-193 and 00078-190 were placed in a 35° C. oven 1 day after initial inclined flow evaluation shown in Table 3. Each sample was evaluated for inclined flow after the indicated period of time identified in Table 5.

TABLE 5

| Sample No. | 150° C. Flow Stored 6 Days at 35° C. Inches | 150° C. Flow Stored 61 days at 35° C. Inches | % Decrease in Flow From Day 6 to Day 61 |
| --- | --- | --- | --- |
| 00078-193 (C12) | 0.75 | 0.3 | 60 |
| 00078-190 (C18) | 1.0 | 0.75 | 25 |

What is claimed is:

1. A method for imparting room temperature stability and improved flow properties to a powder coating comprising contacting a polymer consisting essentially of a copolymer having a pendant functionality capable of reacting with a dicarboxylic acid and a flow-controlling effective amount of a saturated dicarboxylic acid having from 15 to 18 carbon atoms.

2. The method of claim 1 wherein the dicarboxylic acid is octadecanedioic acid.

3. The method of claim 1 wherein the copolymer is a glycidyl methacrylate or a glycidyl acrylate copolymer.

4. The method of claim 1 wherein the effective amount of the dicarboxylic acid is from about 2% to about 50% by weight.

5. A method for imparting room temperature stability and improved flow properties to a powder coating comprising contacting a polymer consisting essentially of a copolymer having glycidyl pendant functionalities and a temperature stabilizing effective amount of octadecanedioic acid.

6. The method of claim 5 wherein the copolymer is a glycidyl methacrylate or a glycidyl acrylate copolymer.

7. The method of claim 5 wherein the effective amount of the dicarboxylic acid is from about 2% to about 50% by weight.

* * * * *